United States Patent [19]

Nelson et al.

[11] Patent Number: 4,868,223
[45] Date of Patent: Sep. 19, 1989

[54] USE OF AMINE INITIATED BUTYLENE OXIDE POLYOLS IN POLYURETHANE PRODUCTS

[75] Inventors: Donald L. Nelson, Middlefield; Douglas P. Waszeciak, North Haven; Douglas K. Hillshafer, Cheshire, all of Conn.

[73] Assignee: The Dow Chemical Company, Midland, Mich.

[21] Appl. No.: 269,267

[22] Filed: Nov. 9, 1988

[51] Int. Cl.$^4$ .............................................. C08G 18/14
[52] U.S. Cl. .................................... 521/122; 521/167; 524/874; 528/77; 252/182.26; 428/425.6
[58] Field of Search ................ 521/122, 167; 524/874; 528/77; 252/182.26; 428/425.6

[56] References Cited

U.S. PATENT DOCUMENTS 4,555,536 11/1985 Maki et al. ............................ 524/66
4,582,891 4/1986 Maki et al. ......................... 528/74.5

FOREIGN PATENT DOCUMENTS

| 978300 | 11/1975 | Canada . |
| 1222528 | 6/1987 | Canada . |
| 128699 | 11/1978 | Japan . |
| 86737 | 6/1980 | Japan . |
| 99218 | 8/1981 | Japan . |
| 81469 | 4/1986 | Japan . |

Primary Examiner—Maurice J. Welsh
Attorney, Agent, or Firm—James S. Rose

[57] ABSTRACT

Disclosed are active hydrogen compositions comprising: (A) a polyether polyol having a functionality of at least about three; (B) an amine-based polyol having an equivalent weight less than about 250 and derived from the addition of at least two moles of butylene oxide to a nitrogen containing compound having at least two active hydrogen atoms; optionally (C) an active hydrogen containing extender of equivalent weight up to about 200; and optionally (D) a low equivalent weight crosslinking polyol other than (B) above.

Also dislcosed are the molded polyurethanes produced from the above compositions and, particularly high strength mat molded reaction injection molded parts.

27 Claims, No Drawings

4,868,223

USE OF AMINE INITIATED BUTYLENE OXIDE POLYOLS IN POLYURETHANE PRODUCTS

FIELD OF THE INVENTION

This invention relates to molded polyurethanes and active hydrogen compositions employed therein and is more particularly concerned with active hydrogen compositions containing certain cross-linking polyols and the use of said compositions in the preparation of molded polyurethanes.

DESCRIPTION OF THE PRIOR ART

The use of amine based polybutyleneoxy polyols in various polyurethane applications, while not as widespread as their ethyleneoxy or propyleneoxy counterparts, is known. For example, Canadian Patent No. 978,300 discloses polyol mixtures of butyleneoxy derivatives of ethylenediamine, diethylenetriamine, and the like with phosphorus containing polyols, halogenated aromatic acid anhydrides, and an alkylene oxide and their use in preparing flame retardant rigid foams. Japanese patent application No. 86737 discloses making molded boards from rice or wheat chaff wherein the binder mixture is an isocyanate terminated prepolymer and hardener mixture of a polyether polyol and an amino alcohol. The prepolymer is prepared from an excess of an isocyanate with an addition product of, inter alia, ethylenediamine with an alkylene oxide such as butylene oxide. Japanese patent application No. 99218 teaches the formation of flexible polyurethane foam from polyisocyanate, polyol and a minor amount of 0.1 to 10 weight percent of total polyol of an alkylene oxide (inclusive of butylene oxide) derivative of an amine (inclusive of ethylenediamine, diethylenetriamine and the like).

Further, Canadian Patent No. 1,222,528 discloses blends of 10 to 90 weight percent polyoxyalkylene polyols and 90 to 10 percent of a mixture of alkoxylated amines inclusive of alkoxylated ethylenediamine with the proviso that at least one free amine group remains unreacted. Such blends are used in polyurethane foam preparation. Japanese patent application No. 128699 discloses certain polyhydroxyl compounds of hydroxyl number of 70 to 224 derived from tetrafunctional starters as ethylenediamine and butylene oxide. These polyols are used in combination with conventional polyols to provide flame proofed polyurethanes. Japanese patent application No. 81469 discloses coating compositions prepared from polymethylene poly(phenyl isocyanates) and amine polyols typically prepared from alkylene oxides such as butylene oxide and ethylenediamine and optionally mixed with polyether glycols.

U.S. Pat. No. 4,555,536 discloses polyurethane coating compositions characterized as anti-corrosive to metals. These compositions are based on mixtures of caster oil polyols with amine based polyols such as ethylenediamine-butylene oxide adducts. U.S. Pat. No. 4,582,891 related to '536 above discloses a process for inhibiting metal corrosion by applying the polyurethane coating of the '536 patent, other non-nitrogen polyols mixed with the castor oil polyol, and even the castor oil polyol by itself.

In the preparation of high strength molded polyurethanes the use of extenders and so-called cross-linking polyols is called upon to provide the strengthening of the part via added cross-linking of the resulting polyurethane matrix. Generally speaking, extenders are difunctional whereas the cross-linkers have functionalities exceeding two. Short chain alkoxylation products of polyfunctional alcohols and particularly polyamines can fall into the category of cross-linking polyols. Most of the polyols noted above having hydroxyl functionalities greater than 2 and based on such starting compounds as ethylenediamine are considered cross-linking polyols.

While the ethylene and/or propylene oxide derivatives of such compounds as ethylenediamine or diethylenetriamine can be used as cross-linkers in molded foam preparation, because of the tertiary nitrogen groups, they are autocatalytic and thus result in very rapid polymer gelation times. This can be quite disadvantageous in the molding of large polyurethane parts even though the molded products can possess good physical properties. Additionally, such aminopolyols tend to result in immiscible B side polyol blends when mixed with glycol extenders and polyols. In an effort to provide longer gelation times, cross-linkers such as low equivalent weight mixtures obtained from ethoxylating blends of glycerine and sucrose have been employed. This results in longer gelation times but the molded parts suffer from poor hydrolytic stability.

It would be highly advantageous to be able to provide molded polyurethanes having the necessary strength to be used in structural applications while having good hydrolytic stability and possessing polymer gelation times longer than the prior art alkoxylated ethylenediamines.

SUMMARY OF THE INVENTION

The present invention is directed to active hydrogen compositions comprising (A) a polyether polyol having a functionality of at least about three; (B) an amine based polyol having an equivalent weight less than about 250 and derived from the addition of at least two moles of butylene oxide to a nitrogen containing compound having at least two active hydrogen atoms: optionally (C) an active hydrogen containing extender of equivalent weight up to about 200; and optionally (D) a low equivalent weight cross-linking polyol.

The invention is also directed to molded polyurethane polymers prepared by the reaction of organic polyisocyanates with the active hydrogen compositions set forth above.

The term "cross-linking polyol" means a polyol or mixture of polyols wherein the functionality has a value inclusive of an average value falling within the range of about 3 to about 8, preferably about 4 to about 6 and a hydroxyl equivalent weight falling within the range of about 70 to about 230, preferably about 80 to about 120.

The term "active hydrogen containing extender" means any chain extender known in the polyurethane art having a functionality of about two and molecular weight in the range of from about 60 to about 400 and wherein the active hydrogen groups are selected from hydroxyl groups, primary amine groups, and mixtures of these groups in the same molecule.

The term "equivalent weight" of any reactive ingredients means their molecular weights divided by their respective number of reactive groups.

The term "molecular weight" as used herein means the number average molecular weight as determined by end-group analysis or other colligative property measurement.

The present compositions, surprisingly, satisfy the desired combination of requirements set forth above when used in the preparation of molded polyurethanes. That is to say, the molded products obtained possess the required strength to be used in structural applications while having superior hydrolytic stability compared with prior art materials. At the same time the polymer gelation times are longer and more forgiving in terms of mold sizes which can be used and margins of error which can be tolerated with such larger moldings.

Even more surprising is the unexpected polyol B side compatibility which is observed with the majority of the compositions in accordance with the invention. This compatibility factor leads to excellent wet-out by the resinous polyurethane forming ingredients of any fibrous reinforcing material employed during the preparation of molded composites. It is in the formation of high strength reaction injection molded (RIM) composites with fiberglass and the like that the present polyol compositions excel both in regard to their processing advantages, i.e. longer gel times and fiber wet-out and for the physical properties of the resulting RIM parts, particularly improved hydrolytic stability.

The molded products are useful as structural members in automotive applications, such as doors, hoods, skirts, load floors, instrument panels, and the like; in the manufacture of appliances, furniture, building construction panels, sporting goods equipment such as shin guards, chest protectors, and the like.

DETAILED DESCRIPTION OF THE INVENTION

The active hydrogen compositions defined above are readily prepared using any conventional means known to one skilled in the art for mixing liquid components together. This includes mixing the components manually or mechanically in small scale hand-mix procedures in suitable containers such as beakers, flasks, pails, and the like, up to large scale batch or continuous mixing in stirred kettles, vats, tanks, and the like. It is preferable, particularly if the compositions are not to be used immediately, or, are being manufactured on a large scale for packaging and eventual shipment and storage, that the components be mixed under the exclusion of air and atmospheric moisture. This is most readily accomplished by mixing under a positive pressure of an inert gas such as nitrogen, argon, and the like. Heating may or may not be necessary to effect the formation of the blends. If it is found expedient to do so for whatever reason such as when a low melting solid or waxy reactive hydrogen component is employed, then the components may be heated together at the necessary temperature to effect solution. All of the components individually are well known to those skilled in this art. It is the specific combination wherein the novelty lies and the essential components are the (A) and (B) components defined above. It is preferred that the compositions do contain some proportion of an extender component (C) which will be discussed below.

The polyether polyol component (A) can be any such polyol provided it has at least 3 hydroxyl groups and a molecular weight of at least 650. It is to be understood that, if desired, mixtures of polyether polyols can be employed so that any functionalities or molecular weights can represent average values. Preferably, the polyol has a molecular weight from about 1,000 to about 12,000 with a functionality from about 3 to about 6. More preferably, the functionality is from about 3 to about 4 with the hydroxyl functionality being predominantly primary and a molecular weight from about 2,000 to about 6,000.

Suitable relatively high molecular weight polyether polyols which can be employed herein include those which are prepared by reacting an alkylene oxide, halogen substituted or aromatic substituted alkylene oxide or mixtures thereof with an active hydrogen-containing initiator compound which will result in a functionality of at least three. Suitable such oxides include, for example, ethylene oxide, propylene oxide, trichlorobutylene oxide, mixtures thereof and the like. Suitable initiator compounds include glycerine, trimethylol propane, pentaerythritol, hexanetriol, sorbitol, sucrose, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, 2,4-toluenediamine, 2,6-toluenediamine, diaminodiphenyloxide(oxydianiline), 2,4'-diaminodiphenylmethane, 4,4'-diaminodiphenylmethane, and the like.

A preferred group of polyols comprises the polyalkyleneoxy polyols particularly the propyleneoxy-polyethyleneoxy capped triols and tetrols obtained by the alkoxylation of ammonia, trimethylolpropane, ethanolamine, ethylene diamine, and the like.

The amine based polyol (B) used in the present invention is a polyol prepared by addition reaction of at least two moles of butylene oxide to a nitrogen-containing compound having at least 2 active hydrogen atoms to result in a hydroxyl equivalent weight less than 250. Preferably, the equivalent weight is from about 80 to about 180, most preferably 80 to 125. It is preferable that the nitrogen containing compound has more than two active hydrogens, advantageously from about 3 to about 8, preferably from about 4 to about 6. It will be recognized by those skilled in the art that this component itself has the overall characteristics of a cross-linking polyol.

Examples of the nitrogen-containing compound are, for instance, ammonia; aliphatic polyamines such as ethylenediamine or diethylenetriamine: an alicyclic amine such as cyclohexylamine: piperazine, isophoronediamine, methylenebis(cyclohexylamine); an aromatic amine in which an amino group is directly linked to the aromatic ring such as aniline, toluidine, aminobenzoic acid, aminophenol, phenylenediamine or bis(aminophenyl)methane; an aromatic amine in which an amino group is indirectly linked to the aromatic ring such as benzylamine; and the like.

A preferred group of amine based polyols are derived from the addition of from about 4 to about 8 moles of butylene oxide per mole of an aliphatic polyamine selected from the group ethylenediamine, diethylenetriamine, triethylenetetramine, and mixtures thereof. More preferred is the class based on ethylenediamine. Even more preferred is the product derived from about 4 to about 6 moles of butylene oxide per mole of ethylenediamine.

In respect of the proportions of the essential components (A) and (B) it will be recognized by those skilled in the art that (B) itself can be representative of a typical low molecular weight polyurethane forming polyol. Accordingly, it can represent a very high proportion of any of the present compositions which will be used in the formation of polyurethane polymers. However, due to its cross-linking character and its relatively low molecular weight, the presence of at least some proportion of higher molecular weight polyether polyol is required. On the other hand, the question of the minimum amount of (B) required to provide at least reduced polyurethane gel times and improved polyurethane hydrolytic stabilities will be less than the minimum amount required to effect complete miscibility of the whole composition particularly when a low molecular weight extender component (C) is present. Generally speaking, and, based on the combined weights of (A) and (B), their respective proportions fall within the range of from about 5 to about 85 and 95 to 15 percent by weight. Preferably, the compositions are from about 15 to about 60 percent (A) and 85 to 40 percent (B), more preferably 30 to 40 and 70 to 60 percent respectively.

The optional extender component (C) defined above while not being an absolutely essential component of the present compositions, is preferred to be included. The most obvious reason to include it is the control which such a component has over the overall physical properties of any resultant molded polyurethanes. For example, when high hardness and flex modulus properties are desired in a polyurethane, then the extender component becomes of great importance.

Such an extender can be any active hydrogen containing extender meeting the above defined requirements. Although the preferred functionality is two, this does not exclude mixtures of extender wherein a minor component is trifunctional so long as the average functionality does not exceed about 2.2. Extender molecular weight is preferably from about 60 to about 200.

Illustrative of such extenders are aliphatic straight and branched chain diols having from about 2 to 10 carbon atoms, inclusive, in the chain. Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 1,9-nonanediol, 2-methyloctane-1,8-diol, 1,4-cyclohexanedimethanol, hydroquinone bis(hydroxyethyl)ether, and the like including mixtures of two or more such diols. The extenders, which can be used alone or in admixture with each other or any of the above diols, also include diethylene glycol, dipropylene glycol, tripropylene glycol, and the like, as well as ester diols obtained by esterifying adipic, azelaic, glutaric and like aliphatic dicarboxylic acids with aliphatic diols such as those exemplified above utilizing from about 0.01 to about 0.8 mole of acid per mole of diol. Also included in the extenders which can be used in preparing the polyurethanes of the invention are the adducts obtained by reacting an aliphatic diol such as 1,4-cyclohexanedimethanol, neopentyl glycol, hexane-1,2-diol, ethylene glycol, butane-1,4-diol, and the like with ε-caprolactone in a mole ratio of from 0.01 to 2 moles of caprolactone per mole of diol or triol. Trifunctional extenders such as glycerol, trimethylolpropane and the like can also be employed in a minor proportion (less than 20 equivalent percent) with one or more of the above diols. Primary amine containing extenders illustratively include ethanolamine, diethanolamine, ethylenediamine, diethylenetriamine, 4,4'-methylenebis(chloroaniline), 3,5-diethyl-2,4-toluenediamine, 3,5-diethyl-2,6-toluenediamine and mixtures thereof, and mixtures of any of the amine extenders with the hydroxyl extender above.

While any of the diol extenders described and exemplified above can be employed alone, or in admixture, it is preferred to use 1,4-butanediol, 1,6-hexanediol, neopentyl glycol, 1,4-cyclohexanedimethanol, ethylene glycol, diethylene glycol, propylene glycol and dipropylene glycol, either alone or in admixture with each other or with one or more aliphatic diols previously named.

The amount of extender employed will depend largely on the desired hardness properties of any resulting polyurethane. Advantageously, its proportions will fall within a range of from 0 to about 70 parts per 100 parts of combined (A) and (B). Preferably, it will be present in the compositions in a range of from about 10 to about 60 parts. More preferably, from about 20 to about 40 parts.

In respect of any additional cross-linking polyol component (D), it will be recognized that its presence is truly optional and not essential. Its use is largely governed by economic considerations. That is to say, if a portion of the primary cross-linking polyol (B) can be replaced while retaining most of its advantages in the final polyurethane polymer, then some economic advantages may be realized.

Accordingly, any cross-linking polyol other than (B) above, and, as broadly defined above can be employed. Illustrative but non-limiting thereof are ethylene oxide and/or propylene oxide derivatives of such initiators as glycerine, trimethylolpropane, trimethylolethane, pentaerythritol, ethanolamine, diethanolamine, triethanolamine, ethylene diamine, propylene diamine, butylene diamine, diethylenetriamine, triethylenetetramine, inositol, sucrose, and derivatives thereof with ethylene and/or propylene oxide, and the like. The illustrative alkyleneoxy derivatives of the alkylene polyamines and mixtures of sucrose and glycerine set forth above are found to be particularly advantageous in the compositions in accordance with the present invention.

In their broadest scope the present compositions contain from 0 to about 60 parts of (D) per 100 parts of combined (A) and (B). In one embodiment the compositions can comprise from about 5 to about 50, preferably from about 10 to about 45 parts of (D) per 100 parts of (A) and (B).

Other optional ingredients can be included in the compositions of this invention inclusive of but not limited to urethane or polyisocyanurate catalysts, internal mold release agents, flame retardants, colorants, wax lubricants, antioxidants, and the like. The only proviso with regard to other optional ingredients is that they do not detract from the advantageous features of these compositions.

The molded polyurethane polymers in accordance with the present invention can be prepared using any of the manual or machine mixing techniques known to this art. The molding operation can also be any of the known molding operations such as open or closed molds, casting the reactants into open molds which are then closed with vice clamps, pneumatically, or mechanically operated molds automatically opened and closed on a continuous turntable operation, and the like. A particularly facile method is the RIM procedure operated either in a static or continuous mode using the procedures for automatically opening/closing the molds, etc. Particular reference to RIM techniques can be found in U.S. Pat. Nos. 4,272,618; 4,296,212; 4,374,210; 4,433,067; 4,435,349; and 4,546,114 which patent disclosures relative thereto are incorporated herein by reference.

Any of the organic polyisocyanates employed in the art for the preparation of molded polyurethanes can be used herein. Included are those organic polyisocyanates disclosed in the incorporated references such as organic di- or higher functionality aliphatic or aromatic polyisocyanates. The preferred class comprises the aromatic polyisocyanates.

Illustrative, but not limiting thereof, are 1,6-hexamethylene diisocyanate, 1,4-cyclohexylene diisocyanate, 4,4'-methylenebis(cyclohexyl isooyanate), m- and p-phenylene diisocyanate, 2,4- and 2,6-toluene diisocyanate and mixtures of these two isomers, methylenebis(phenyl isocyanate) inclusive of 4,4'-methylenebis(phenyl isocyanate), 2,4'-methylenebis(phenyl isocyanate), and mixtures of these methylenebis(phenyl isocyanate) isomers, 3,3'-dimethyl-4,4'-diisocyanatodiphenyl methane; liquefied forms of methylenebis(phenyl isocyanate) particularly liquefied forms (including mixtures containing up to about 50 percent of the 2,4'-isomer) of 4,4'-methylenebis(phenyl isocyanate) such as the carbodiimide-containing 4,4'-methylenebis(phenyl isocyanates) having isocyanate equivalent weights of from about 130 to about 180 prepared for example by heating 4,4'-methylenebis(phenyl isocyanate) with a carbodiimide catalyst to convert a portion of said isocyanate to carbodiimide: and liquefied forms of 4,4'-methylenebis(phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof; isocyanate terminated prepolymers having an isocyanate content of about 9 to about 20 percent by weight prepared from methylenebis(phenyl isocyanate) and a polyol having a functionality from 2 to 3 selected from polyalkyleneoxy polyols of molecular weight 1000 to 10,000, polytetramethylene glycols of molecular weight 600 to 5000, and polyester polyols of molecular weight 500 to 8000, said polyol and said methylenebis(phenyl isocyanate) being reacted in the proportions of about 0.01 equivalent to about 0.5 equivalent of said polyol per isocyanate equivalent; blends or mixtures of the liquefied methylenebis(phenyl isocyanates) with each other and with the isocyanate terminated prepolymers described above in any proportions desired: polymethylene poly(phenyl isocyanate) mixtures containing from about 20 percent to about 85 percent by weight (preferably about 30 to about 60 percent) of methylenebis(phenyl isocyanate), with the balance of 80 to 15 percent by weight (70 to 40 percent) of the mixtures being polymethylene poly(phenyl isocyanates) of functionality higher than 2: included in the polymethylene poly(phenyl isocyanates) are those having the 4,4'-methylenebis(phenyl isocyanate) isomer and mixtures including up to about 30 percent of the corresponding 2,4'-isomer. One of the inherent advantages in the present polymers is the fact that they can be obtained with excellent physical properties while using the commercially attractive so-called crude polyisocyanate mixtures. To this extent, particularly preferred are the polymethylene poly(phenyl isocyanate) mixtures described above.

In its broadest scope the present invention comprehends the reaction of any one of the isocyanates described above or mixtures thereof with the active hydrogen compositions described in detail above. During the preparation of the polymers the components (A), (B), and (C), and (D), if the latter two be present, need not be added as the premixed blend but can be added in any sequence or combination desired. In another embodiment, one or more of the components, particularly the polyether polyol or optional cross-linking polyol can be prereacted with polyisocyanate to form a soft or hard segment quasi-prepolymer or prepolymer which is then reacted with (B) and (C). In the most preferred and convenient embodiment, the ingredients are added as the premixed compositions described above in a one-shot process.

Accordingly, all of the subject matter and discussion set forth above in respect of the active hydrogen compositions along with the proportions including the preferred and more preferred limitations, apply with equal force in the preparation of the molded polyurethanes.

In its broadest scope the molded polyurethanes may be prepared optionally in the presence of a urethane and/or isocyanurate forming catalyst. The presence of the latter is dictated by the isocyanate to active hydrogen equivalents ratio. That is to say, if it is desired to have polyisocyanurate linkages along with the polyurethane in the resulting polymer, then a ratio exceeding about 1.15:1 is called for in conjunction with an isocyanurate forming catalyst. If mainly polyurethane linkages are desired, the active hydrogen composition with (B) containing its nitrogen atom content is autocatalytic in terms of urethane formation, then a urethane catalyst is generally not necessary. Accordingly, the proportions of reactants are chosen such that the ratio of isocyanate equivalents to the total active hydrogen equivalents from (A), (B), (C), and (D) falls within a range of from about 0.85:1 to about 4:1 provided that when said ratio exceeds about 1.15:1 an isocyanurate catalyst is employed. Preferably, the isocyanate to total active hydrogen equivalent ratio falls within a range of from about 0.90:1 to about 1.15:1, and, most preferably 0.95:1 to 1.10:1.

Any of the urethane catalysts known in the art can be employed in catalytic amounts in the present process if desired. Such catalysts include organic and inorganic acid salts of, and organometallic derivatives of bismuth, tin, lead, antimony, cobalt, and the like, as well as phosphines and tertiary organic amines. A preferred group of such catalysts include stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isoocitylthioglycolate), and the like: triethylamine, triethylenediamine, N,N,N',N'-tetramethylethylenediamine, N-methylmorpholine, N,N-dimethylcyclohexylamine, and the like, and mixtures of the above in any combination.

The trimerization catalyst if employed can be any catalyst known to those skilled in the art which will catalyze the trimerization of an organic isocyanate compound to form the isocyanurate moiety. For typical isocyanate trimerization catalysts see The Journal of Cellular Plastics, November/December 1975, page 329; and the patents cited supra which disclosures are already herein incorporated.

Typical catalyst classes are the glycine salts and tertiary amine trimerization catalysts and alkali metal carboxylic acid salts disclosed in the above patents and mixtures of the various types of catalysts. Some preferred species within the classes are sodium N-(2-hydroxy-5-nonylphenyl)methyl-N-methylglycinate, and N,N-dimethylcyclohexylamine, and mixtures thereof. Also included in the preferred catalyst components are the epoxides disclosed in U.S. Pat. No. 3,745,133.

The total quantity of catalyst if used, including mixtures thereof, can fall within a range of from about 0.001 percent by weight to about 5 percent based on total polyurethane or polyisocyanurate forming ingredients weight.

As noted previously, any such catalyst component, if desired, can be included in the active hydrogen compositions of this invention.

In an optional embodiment the polyurethane resin employed can be filled or reinforced in order to provide so-called RRIM articles. The fillers can be any of the conventional materials used in the art. Typically, these include flaked or milled glass, glass fibers in lengths of from about 1/16 inch to ¼ inch, glass strands, and the like, alumina, titanium dioxide, calcium carbonate, talc, carbon black, powdered gypsum, natural clays such as kaolin, china clay, chopped rubber scrap, natural silica, and the like.

The fillers can be used in proportions of from about 1 to about 50 percent by weight based on the polyurethane resin forming ingredients, and, preferably, from about 5 to about 30 percent by weight.

Other optional additives can be employed in the resin forming ingredients. Typical of such additional components are those additives set forth above for optional inclusion in the active hydrogen compositions but which instead can be added at the stage when the polyurethanes are being prepared. Typical but non-limiting flame retardant additives which can be added are the phosphorus containing flame retardants including those having active hydrogen reactivity (hydroxyl and amine groups) such as dibromoneopentyl glycol, tris(2-chloroethyl)phosphate, tris(2-chloropropyl)phosphate, tris(2,3-dibromopropyl)phosphate, tri(1,3-dichloroisopropyl)phosphate, and the like.

In yet another optional embodiment, cellular polyurethanes of varying degrees of densities can be produced by the incorporation of blowing agents into the formulation, including in the active hydrogen compositions. Suitable blowing agents are fully described in U.S. Pat. Nos. 4,125,487 and 3,753,933 whose disclosures relative thereto are incorporated herein by reference. Illustrative blowing agents are the low boiling halogenated hydrocarbons, e.g. methylene chloride and trichloromonofluoromethane.

Other suitable methods for density reduction include frothing or injecting air or gas into the mixture of reacting components. Illustrative of such gases are nitrogen, oxygen, carbon dioxide, xenon, helium, and the like. In the event cellular foams are the objective, cell control agents can be employed. Suitable agents are the silicone based materials commercially available under many well known trade names.

It is in the preparation of high strength reinforced molded composites wherein the present active hydrogen compositions and the resulting polyurethanes excel. The term "high strength" means having a flex modulus of at least 200,000 psi and preferably from about 200,000 to 5,000,000 psi. The term "composite" as it refers to the products made in accordance with the present invention has the significance generally accepted in the molding art to include the use of fibrous matted material embedded into, or impregnated by, the resin component which in the present case is preferably a polyurethane resin. The fibrous material acts as a reinforcing element. The term does not include loose fibrous material. The term includes in its scope mat molded RIM (or MMRIM) articles. Additionally, included in the present process are the use of the fillers set forth above.

The term "fibrous material" does mean a fibrous material in the form of a mat. The fibrous components can be held within the mat form by mechanical forces but more often by the use of a polymeric adhesive such as a polyvinyl acetate, polyester, polyepoxide, and the like, or else by being woven or stitched. The fibrous arrangement in the mat can be random or oriented, and the like. Illustratively the fibrous material can be glass fiber, or an organic fiber inclusive of graphite fiber, polyester fiber, polyamide fiber, polyaramid fiber, and the like. The above fibrous materials are meant to be exemplary only with the present process not limited solely to these examples. Any fibrous mat material can be employed in the present method. Although glass fibrous material is most preferred in the weight proportions set forth below.

At least one mat is employed in the process of the invention and preferably a plurality thereof with the only limitation in numbers being imposed by practical considerations and by the thickness of the molded part being prepared and the thickness of the mats involved. It is also advantageous at times to employ combinations of at least one organic fiber mat along with the at least one fiberglass mat.

The mats are placed in the mold either manually or by a mechanical delivery system prior to placing the mold cover in-position.

The weight percent contributed to the composite will vary considerably depending on the type of fibrous material employed. Advantageously, it will fall within the range of from about 10 to about 70 weight percent, preferably from about 10 to about 60 weight percent.

Although it is not an essential requirement in the process of the present invention, it is preferred that the molds be at a temperature above ambient room temperatures when they receive the resin forming ingredients. Advantageously, the mold temperatures fall within the range of from about 120° F. to about 220° F. It will be readily understood that mold temperatures will vary depending on whether polyurethane or polyurethane-polyisocyanurate is being prepared; for the former, mold temperatures of about 120° F. to about 170° F. are advantageous while a range of from about 160° F. to about 220° F. is more useful for the latter.

The following examples describe the manner and process of making and using the invention and set forth the best mode contemplated by the inventors of carrying out the invention but are not to be construed as limiting.

EXAMPLE 1

This experiment describes the preparation of two active hydrogen compositions and their employment in preparing two molded polyurethanes (marked runs 1 and 2) all in accordance with the present invention. Also described are two compositions and their use in preparing two molded polyurethanes (marked comparison runs 1 and 2) not in accordance with this invention.

The components of all four blends are mixed together by stirring in the proportions of parts by weight set forth in Table I to form the respective compositions marked component B prior to forming the polyurethane polymers. It is noteworthy that comparison blends 1 and 2 containing prior art cross-linking Polyol A and Polyol A with C respectively, are not compatible but settle into two layers when stirring or agitation is stopped. Contrastingly, Blend 1 with Polyol B in accordance with the invention is completely miscible or compatible with no phase separation. Blend 2 also in accordance with this invention with the lesser amount of Polyol B in combination with Polyol A does show some separation upon standing. Accordingly, the use of Polyol B as the major cross-linking polyol in the present blends results in component B compatibility, whereas the prior art cross-linking Polyols A and C result in component B incompatiblity. At the same time, the viscosity of the blend with Polyol B is reduced compared with the comparison blends.

In the preparation of the molded polyurethanes, the A tank of a Krauss-Maffei Model PU-40 RIM machine is charged with the polyisocyanate component at 85° F. The B tank is charged with the component B ingredients at 125° F. Metering pumps from each tank are used to deliver the A and B components in the proportions in parts by weight set forth in Table I at about 1,000 psi into the impingement mixing head of the RIM machine. The ratio of equivalents of isocyanate to active hydrogen for all runs is 1.05. After mixing, the reaction mixture is directed at the rate of 60 pounds per minute into a metal plaque molding tool measuring 20 inches × 18 inches × ⅛ inch at 160° F. No postcuring is carried out.

The polyurethane gel time in seconds for each run is measured by discharging a sample of the shot from the RIM head into a cup and measuring the time it takes for the sample to visibly solidify. Clearly, the runs 1 and 2 show gel times which are longer and more manageable than for the prior art comparison 1 run containing the fast gelling cross-linking Polyol A Comparison run 2 having the 50/50 by weight mixture of cross-linking Polyols A and C (the latter being a slow gelling polyol) shows a much longer gel time than either runs 1 or 2.

The physical properties of the molded parts are determined as set forth in Table I. A most significant difference in properties between runs 1 or 2 and, particularly comparison 2 is their clear superiority in moisture resistance as evidenced by the percent retention of flex strength and modulus over comparison 2 when the molded samples are subjected to a water boil test. This test is carried out by subjecting pieces of the molded polymers measuring 1 inch × 3 inches × 0.125 inch to boiling water for five hours. Quite obviously, run 1 at 90 percent flex strength and 76 percent modulus retention is far superior to comparison 2 at 42 and 33 percent retention and virtually equal to comparison 1 in strength retention. At the same time, run 2 is still superior to comparison 2 while not showing quite the same retention as run 1.

Accordingly, run 1 shows physical properties (except for HDT) which closely equal those of comparison 1 which employs the highly favored prior art cross-linking Polyol A while at the same time achieving this result at a more manageable gel time and with B side full compatibility. It is observed that employment of Polyol A in combination with present cross-linking Polyol B in run 2 brings the HDT value above that of run 1 and closer to comparison 1.

TABLE I

| Runs | Comp. 1 | Comp. 2 | 1 | 2 |
|---|---|---|---|---|
| Ingredients (pts. by wt.): | | | | |
| Component A | | | | |
| Polyisocyanate[1] | 182 | 167.6 | 162.4 | 172.3 |
| Component B | | | | |
| Polyol A[2] | 50 | 25 | — | 25 |
| Polyol B[3] | — | — | 50 | 25 |
| Polyol C[4] | — | 25 | — | — |
| Diethylene glycol | 30 | 30 | 30 | 30 |
| Polyol D[5] | 25 | 25 | 25 | 25 |
| Properties | | | | |
| Polyurethane gel time (sec.) | 19 | 42 | 29 | 23 |
| Specific gravity | 1.24 | 1.22 | 1.16 | 1.22 |
| Tensile str., (psi) | 11,000 | 8,000 | 8,000 | 10,000 |
| Tensile mod., (psi × 10³) | 420 | 350 | 420 | 420 |
| Flex str., (psi) | 15,000 | 11,000 | 10,000 | 15,000 |
| Flex str., psi (after water boil) | 14,000 | 4,600 | 9,000 | 11,000 |
| Flex str., (% retention) | 93.3 | 41.8 | 90 | 73.3 |
| Flex mod. (psi × 10³) | 370 | 185 | 290 | 350 |
| Flex mod. (psi × 10³) (after water boil) | 305 | 61 | 221 | 236 |
| Flex mod. (% retention) | 82.4 | 33.0 | 76.2 | 67.4 |
| HDT @ 264 psi (°C.)[6] | 82 | 64 | 66 | 72 |

Footnotes to Table I
[1]Polyisocyanate: a polymethylene poly(phenyl isocyanate) mixture containing about 40 percent by weight methylenebis(phenyl isocyanate) and the remainder being polymethylene poly(phenyl isocyanate) of functionality greater than 2; I.E. = about 134.
[2]Polyol A: a cross-linking polyol which is the mixed ethylene oxide/propylene oxide adduct of ethylene diamine; eq. wt. = about 70; functionality = about 4.
[3]Polyol B: N,N,N',N'—tetrakis(2-hydroxybutyl)ethylene-diamine prepared by reacting a one molar proportion of ethylenediamine with 4 molar proportions of butylene oxide; eq. wt. = 87.2.
[4]Polyol C: a cross-linking polyol which is the product of reacting ethylene oxide with a sucrose/glycerine blend of average functionality of about 4.1 to an equivalent weight = about 98.6.
[5]Polyol D: a polypropyleneoxy-polyethyleneoxy triol, molecular weight about 4950.
[6]HDT: Heat deflection temperature determined in accordance with ASTM Test Method D256-56.

EXAMPLE 2

This experiment describes a duplication of the runs 1 and 2 and comparison runs 1 and 2 as described in Example 1 using the same ingredients and proportions as set forth in Table I above except for the use of fiberglass reinforcing mats in the molded polyurethane parts. Each run and comparison run are carried out in pairs. In the first, two of the mats are laid into the tool before the mold is closed and the part formed whereas in the second, four of the mats are laid into the tool. The mats employed are 2 oz./sq. ft. continuous strand fiberglass mats bonded together by a polyester resin and supplied under the designation M-8610 by Owens Corning Fiberglass.

The physical properties of the molded parts including the five hour water boil test described above are determined with the values set forth in Table II. The presence of the reinforcing mats shift the physical properties in the expected directions for all the samples including the comparison runs and runs 1 and 2 of the invention. In respect of the percent retention of flex strength after the water boil, run 1 shows clear superiority over both comparison runs 1 and 2. Run 2 displays excellent retention but not as high as Run 1. Flexural modulus retention is measured as fairly uniform over all the runs.

Run 1 is characterized by the slower ge time compared with comparison 1.

TABLE II

| Runs | Comparison 1 | | Comparison 2 | | 1 | | 2 | |
|---|---|---|---|---|---|---|---|---|
| No. of Glass Mats | 2 | 4 | 2 | 4 | 2 | 4 | 2 | 4 |
| Tensile str. (psi) | 18,700 | 28,000 | 17,200 | 24,800 | 12,100 | 25,300 | 17,700 | 26,600 |
| Tensile mod. (psi × 10³) | 1,130 | 1,570 | 920 | 1,360 | 1,010 | 15,110 | 1,075 | 1,510 |
| Flex. str. (psi) | 25,500 | 47,500 | 26,200 | 35,100 | 23,300 | 40,200 | 28,800 | 43,400 |
| Flex. str. (psi) (after water boil) | 22,100 | 35,100 | 19,500 | 23,700 | 21,700 | 30,200 | 22,300 | 33,900 |
| Flex. str. (% retention) | 83.4 | 73.9 | 74.4 | 67.5 | 93.1 | 75.1 | 77.4 | 78.1 |
| Flex. mod. (psi × 10³) | 840 | 1,460 | 770 | 1,080 | 840 | 1,290 | 930 | 1,300 |
| Flex. mod. (psi × 10³) (after water boil) | 600 | 1,220 | 630 | 840 | 645 | 1,034 | 685 | 1,080 |
| Flex. mod. (% retention) | 71.4 | 83.5 | 81.8 | 77.8 | 76.8 | 80.2 | 73.6 | 83.1 |
| HDT @ 264 psi (°C.) | 185 | 207 | 135 | 191 | 114 | 194 | 180 | 202 |
| Notched Izod Impact[1] (ft.-lbs./in.) | 7.6 | 13.2 | 7.6 | 14.6 | 7.8 | 13.6 | 10.1 | 14.2 |

Footnote to Table II
[1]Notched Izod Impact: Impact strength measured in accordance with ASTM Test Method D256-56.

What is claimed is:

1. An active hydrogen composition comprising (A) a polyether polyol having a functionality of at least about three; (B) an amine based polyol having an equivalent weight less than about 250 and derived from the addition of at least two moles of butylene oxide to a nitrogen containing compound having at least two active hydrogen atoms; optionally (C) an active hydrogen containing extender of equivalent weight up to about 200; and optionally (D) a low equivalent weight cross-linking polyol.

2. A composition according to claim 1 wherein said polyether polyol (A) has a functionality from about 3 to about 6 and a molecular weight from about 1,000 to about 12,000.

3. A composition according to claim 1 wherein said amine based polyol (B) has an equivalent weight from about 80 to about 180.

4. A composition according to claim 1 wherein said amine based polyol (B) is derived from the addition of from about 4 to about 8 moles of butylene oxide per mole of an aliphatic polyamine selected from the group consisting of ethylenediamine, diethylenetriamine, triethylenetetramine, and mixtures thereof.

5. A composition according to claim 4 wherein said polyamine is ethylenediamine.

6. A composition according to claim 1 which comprises from about 5 to about 85 percent by weight of polyol (A) and about 95 to about 15 percent of amine based polyol (B) based on combined weight of (A) and (B).

7. A composition according to claim 1 additionally comprising from 0 to about 70 parts per 100 parts of (A) and (B) of a difunctional extender (C)

8. A composition according to claim 7 wherein (C) comprises from about 10 to about 60 parts.

9. A composition according to claim 1 additionally comprising from 0 to about 60 parts per 10 parts of (A) and (B) of a cross-linking polyol (D).

10. A composition according to claim 9 wherein (D) comprises from about 5 to about 50 parts.

11. A composition according to claim 1 comprising
(A) from about 5 to about 85 percent by weight of a polyether polyol of functionality from about 3 to about 6 and molecular weight from about 1,000 to about 12,000; and
(B) from about 95 to about 15 percent by weight of an amine based polyol having an equivalent weight from about 80 to about 180 and derived from the addition of from about 4 to about 8 moles of butylene oxide per mole of ethylenediamine, and based on 100 parts of said (A) and (B),
(C) from about 10 to about 60 parts of a difunctional extender of equivalent weight up to about 200; and
(D) from 0 to about 60 parts of a cross-linking polyol of equivalent weight from about 70 to about 230 and functionality from about 3 to about 8.

12. A composition according to claim 11 comprising
(A) from about 15 to about 60 percent by weight of a polyalkyleneoxy polyol of functionality from about 3 to about 4 and molecular weight from about 2,000 to about 6,000; and
(B) from about 85 to about 40 percent of an amine based polyol of equivalent weight from about 80 to about 125 and derived from the addition of from about 4 to about 6 moles of butylene oxide per mole of ethylenediamine; and based on 100 parts of said (A) and (B),
(C) from about 10 to about 60 parts of a difunctional extender of equivalent weight from about 30 to about 200; and
(D) from 0 to about 60 parts of a cross-linking polyol of equivalent weight or average equivalent weight from about 80 to about 120 and average functionality from about 4 to about 6.

13. A composition according to claim 12 wherein said (A) comprises from about 30 to about 40 weight percent of a polypropyleneoxy-polyethyleneoxy triol having a molecular weight of about 4,500 to about 5,500 and (B) from about 70 to about 60 percent of N,N,N',N'-tetrakis(2-hydroxybutyl)ethylenediamine based on total weight of (A) plus (B).

14. A composition according to claim 13 containing from about 20 to about 45 parts per 100 parts of (A) plus (B) of diethylene glycol component (C).

15. A composition according to claim 14 containing from about 5 to about 50 parts per 100 parts of (A) and (B) of an ethylene and/or propylene oxide derivative of ethylenediamine cross-linking component (D).

16. A molded polyurethane polymer prepared by the reaction of an organic polyisocyanate and an active hydrogen composition comprising (A) a polyether polyol having a functionality of at least about three; (B) an amine based polyol having an equivalent weight less than about 250 and derived from the addition of at least two moles of butylene oxide to a nitrogen containing compound having at least two active hydrogen atoms; optionally (C) an active hydrogen containing extender having a functionality of at least two and equivalent weight up to about 200; and optionally (D) a low equivalent weight cross-linking polyol.

17. A molded polyurethane according to claim 16 wherein said polyisocyanate comprises polymethylene poly(phenyl isocyanate).

18. A molded polyurethane according to claim 16 wherein the proportions of reactants are such that the ratio of isocyanate equivalents to total active hydrogen equivalents falls within a range of from about 0.85:1 to about 4:1 provided that when said ratio exceeds about 1.15:1 an isocyanurate catalyst is present.

19. A molded polyurethane according to claim 16 wherein the ratio of isocyanate equivalents to total active hydrogen equivalents is from about 0.90:1 to about 1.15:1.

20. A molded polyurethane according to claim 16 additionally comprising a fibrous reinforcing material.

21. A molded polyurethane according to claim 16 prepared by the reaction injection molding procedure.

22. A reaction injection molded polyurethane prepared by the reaction of:
I. a polymethylene poly(phenyl isocyanate); and
II. an active hydrogen composition comprising:
 (A) from about 5 to about 85 percent by weight of a polyether polyol of functionality from about 3 to about 6 and molecular weight from about 1,000 to about 12,000;
 (B) from about 95 to about 15 percent of an amine based polyol of equivalent weight from about 80 to about 180 and derived from the addition of from about 4 to about 8 moles of butylene oxide per mole of ethylenediamine and based on 100 parts of (A) and (B);
 (C) from 10 to about 60 parts of a difunctional extender of equivalent weight up to about 200; and
 (D) from 0 to about 60 parts of a cross-linking polyol of equivalent weight from about 70 to about 230 and functionality from about 3 to about 8 wherein the proportions of reactants are such that the ratio of isocyanate equivalents to total active hydrogen equivalents from (II) falls within a range of from about 0.90:1 to about 1.15:1.

23. A molded polyurethane according to claim 22 wherein (11) comprises:
 (A) from about 15 to about 60 percent by weight of a polyalkyleneoxy polyol of functionality from about 3 to about 4 and molecular weight from about 2,000 to about 6,000; and
 (B) from about 85 to about 40 percent by weight of an amine based polyol of equivalent weight from about 80 to about 125 and derived from the addition of from about 4 to about 6 moles of butylene oxide per mole of ethylenediamine; and based on 100 parts of said (A) and (B),
 (C) from about 10 to about 60 parts of a difunctional extender of equivalent weight from about 30 to about 200; and
 (D) from 0 to about 60 parts of a cross-linking polyol or mixture thereof of equivalent weight or average equivalent weight from about 80 to about 120 and average functionality from about 4 to about 6.

24. A molded polyurethane according to claim 23 wherein said (A) comprises from about 30 to about 40 percent by weight of a polypropyleneoxy-polyethyleneoxy triol having a molecular weight of about 4,500 to about 5,500 and (B) from about 70 to about 60 percent of N,N,N',N'-tetrakis(2-hydroxybutyl)ethylenediamine based on total weight of (A) plus (B).

25. A molded polyurethane according to claim 24 containing from about 20 to about 45 parts per 100 parts of (A) plus (B) of diethylene glycol component (C).

26. A molded polyurethane according to claim 25 containing from about 5 to about 50 parts per 100 parts of (A) plus (B) of an ethylene and/or propylene oxide derivative of ethylenediamine cross-linking component (D).

27. A molded polyurethane according to claim 22 additionally comprising at least one reinforcing fiberglass mat.

* * * * *